United States Patent
Zhou et al.

(10) Patent No.: US 9,149,792 B2
(45) Date of Patent: Oct. 6, 2015

(54) PROCESS FOR PREPARING BALL-TYPE DESULFURIZER WITH HIGH SULFUR CAPACITY AND PRODUCT THEREOF

(75) Inventors: Tong Zhou, Beijing (CN); Gang Zhao, Beijing (CN); Fujiang Hong, Beijing (CN); Wenjun Mao, Beijing (CN); Qunyang Gao, Beijing (CN); Bingyi Li, Beijing (CN)

(73) Assignee: BEIJING SJ ENVIRONMENTAL PROTECTION AND NEW MATERIAL CO., LTD., Beijing (CN)

( * ) Notice: Subject to any disclaimer, the term of this patent is extended or adjusted under 35 U.S.C. 154(b) by 0 days.

(21) Appl. No.: 14/122,536

(22) PCT Filed: May 21, 2012

(86) PCT No.: PCT/CN2012/075801
§ 371 (c)(1),
(2), (4) Date: Jan. 17, 2014

(87) PCT Pub. No.: WO2012/163232
PCT Pub. Date: Dec. 6, 2012

(65) Prior Publication Data
US 2014/0135211 A1    May 15, 2014

(30) Foreign Application Priority Data

May 27, 2011  (CN) .......................... 2011 1 0140460

(51) Int. Cl.
| | | |
|---|---|---|
| *B01J 20/06* | (2006.01) | |
| *B01J 20/08* | (2006.01) | |
| *B01J 20/30* | (2006.01) | |
| *B01D 53/50* | (2006.01) | |
| *B01J 20/28* | (2006.01) | |
| *B01J 20/10* | (2006.01) | |
| *C01G 49/02* | (2006.01) | |
| *B01J 20/02* | (2006.01) | |
| *B01J 20/32* | (2006.01) | |

(52) U.S. Cl.
CPC ............ *B01J 20/3078* (2013.01); *B01D 53/508* (2013.01); *B01J 20/06* (2013.01); *B01J 20/106* (2013.01); *B01J 20/2803* (2013.01); *B01J 20/28004* (2013.01); *B01J 20/28019* (2013.01); *B01J 20/28042* (2013.01); *B01J 20/3028* (2013.01); *B01J 20/3042* (2013.01); *B01J 20/3204* (2013.01); *B01J 20/3236* (2013.01); *B01J 20/3293* (2013.01); *C01G 49/02* (2013.01); *B01D 2253/102* (2013.01); *B01D 2253/1124* (2013.01); *B01D 2253/304* (2013.01); *B01D 2255/20738* (2013.01); *B01J 20/0229* (2013.01); *B01J 20/08* (2013.01); *B01J 20/32* (2013.01)

(58) Field of Classification Search
CPC ........ B01J 20/32; B01J 20/0229; B01J 20/06; B01J 20/08
USPC ................... 502/10, 401, 406, 415
See application file for complete search history.

(56) References Cited

U.S. PATENT DOCUMENTS 5,102,636 A    4/1992  Kodama et al.

FOREIGN PATENT DOCUMENTS

| CN | 101584962 A | 11/2009 |
|---|---|---|
| WO | WO 2010/139104 A1 | 12/2010 |

OTHER PUBLICATIONS

Chao Huo et al., "A Fractal Simulation on the Making Process of the Solid Desulfurizer", Environmental Protection, No. 8, Aug. 1998, pp. 47-48.
Canadian Examination Report for CA 2,837,361 dated Mar. 12, 2015 (related to CN2012075801).

*Primary Examiner* — Matthew E Hoban
*Assistant Examiner* — James Fiorito
(74) *Attorney, Agent, or Firm* — Birch, Stewart, Kolasch & Birch, LLP

(57) ABSTRACT

The present invention provides a process for preparing ball-type desulfurizer with high sulfur capacity, comprising the following steps: placing initial balls in a rolling equipment; wetting the surface of the initial balls with an aqueous solution of an organic binder; then alternately adding non-crystalline iron oxide hydroxide and the aqueous solution of the organic binder to gradually form small balls of non-crystalline iron oxide hydroxide with high sulfur capacity and different diameters; and adjusting the shape of the small balls and then roasting or naturally drying the small balls. In the desulfurizer prepared by this method, the initial balls constitutes 0.98 wt %-9.03 wt % of the desulfurizer, the non-crystalline iron oxide hydroxide constitutes 90.29 wt %-98.62 wt % of the desulfurizer, and the organic binder constitutes 0.58 wt %-0.89 wt % of the desulfurizer. The present invention solves the problems that the desulfurizer with high sulfur capacity in the prior art has a high binder content and poor water resistance and diffusion performance, and provides a process for preparing a desulfurizer with high sulfur capacity, wherein a desulfurizer with high sulfur capacity and low binder content, good water resistance, good diffusion performance can be prepared.

8 Claims, 1 Drawing Sheet

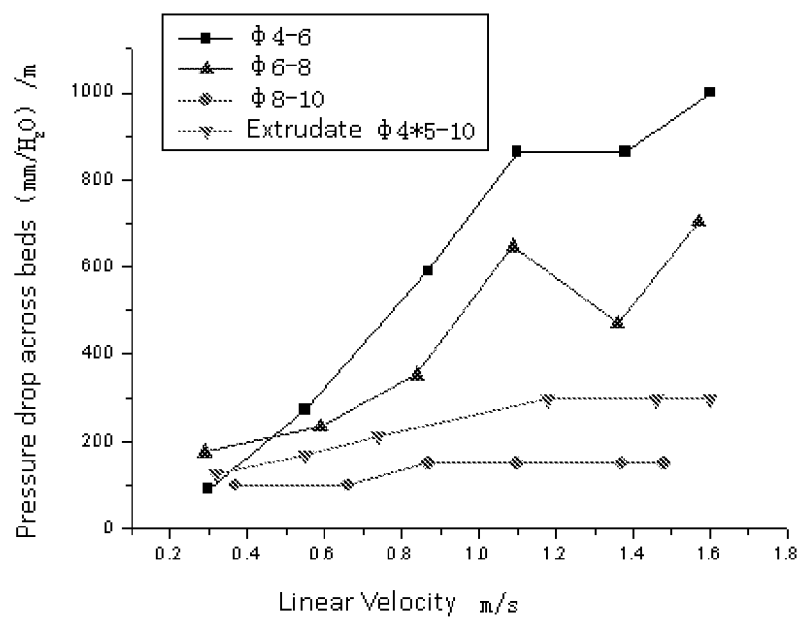

PROCESS FOR PREPARING BALL-TYPE DESULFURIZER WITH HIGH SULFUR CAPACITY AND PRODUCT THEREOF

FIELD OF THE INVENTION

This invention refers to a process for preparing desulfurizer and product thereof. More particularly, this invention refers to a process for preparing ball-type desulfurizer with high sulfur capacity and product thereof.

BACKGROUND OF THE INVENTION

It is well known that, large amounts of hydrogen sulfide are emitted from many industries including sewage treatment, paper making, petroleum processing, fertilizer manufacturing, chemical fiber manufacturing as well as some chemical raw materials manufacturing industries. These hydrogen sulfide emissions will not only cause environmental pollution, but also easily lead to poisoning and deactivation of catalyst. Therefore, reducing the emissions of hydrogen sulfide of industrial production becomes one of the major problems that need to be resolved in the industrial production in the present world.

Currently, in order to reduce the impact of hydrogen sulfide on the environment and industrial production effectively, a variety of desulfurizers for hydrogen sulfide are developed in the market, including iron based desulfurizer, manganese oxide-based desulfurizer, solid alkali desulfurizer, liquid desulfurizer and activated carbon desulfurizer, etc., among which iron based desulfurizer is mostly used. The iron based desulfurizer comprises one or more substances selected from the group of ferroferric oxide, ferric oxide and hydrous ferric oxide as the main active components.

U.S. Pat. No. 5,102,636A discloses a compound desulfurizer which is consisted of iron oxide and iron. These iron based desulfurizers are usually of low sulfur capacity which only reaches 27% as the highest, thus the desulfurization effect is not ideal. Besides, most of the iron-based desulfurizers do not have high mechanical strength and good water resistance, and have low pressure drop across beds. So when being applied in working conditions for desulfurization of hydrous refinery gas, shifted gas and liquefied petroleum gas and so on, those iron-based desulfurizers are easily pulverized or hardened due to soaking in water, resulting in a too large pressure drop across beds and even causing block of towers. A patent application of this applicant published as CN101584962A provides a high-strength iron oxide hydroxide desulfurizer and preparation method thereof, wherein a carrier, non-crystalline iron oxide hydroxide and an organic binder were mixed to yield a mixture which then was extruded to produce a extrudate desulfurizer. The desulfurizer is consisted of 50 to 95% non-crystalline iron oxide hydroxide, 0 to 45% carrier and 5-50% organic binder, and has the characteristics such as high sulfur capacity and high mechanical strength. However, the organic binder may be dissolved in water, so when the content of the organic binder is high, the desulfurizer is easily expanded and deformed when contacting with water, and the water resistance of the desulfurizer is poor. In addition, the clearances in the desulfurizer materials are small due to extrusion molding, which is not conducive to the spread of the flue gas therein. Therefore, the desulfurizer in the prior art has the shortcomings such as poor water resistance and poor diffusion performance due to the high content of organic binder and extrusion molding. If reducing the binder content, molded desulfurizer products with high mechanical strength and high anti-extrusion property cannot be obtained by the preparation method for desulfurizer of the prior art.

SUMMARY OF THE INVENTION

In view of the above-described problems, since the desulfurizers with high sulfur capacity of the prior art have the problems that when the binder content is high, the water resistance and diffusion performance are poor, and when the binder content is low, the molding of the desulfurizer products is difficult and the mechanical strength is low, the present invention provides a process for preparing a desulfurizer with high sulfur capacity, wherein a desulfurizer with good water resistance, good diffusion performance and high mechanical strength can be prepared with using a low content of binder.

In order to solve the above-described technical problems, the present invention provides a process for preparing a ball-type desulfurizer with high sulfur capacity, comprising the following steps: placing initial balls in a rolling equipment, in which the balls roll; wetting the surface of the initial balls with an aqueous solution of an organic binder; then alternately adding non-crystalline iron oxide hydroxide and the aqueous solution of organic binder, so that the non-crystalline iron oxide hydroxide adheres on the initial balls via the organic binder to gradually form small balls of non-crystalline iron oxide hydroxide with high sulfur capacity and different diameters; and adjusting the shape of the small balls obtained in the above step, and then roasting or naturally drying the small balls to yield the ball-type desulfurizer with high sulfur capacity.

Said initial balls constitutes 0.98 wt %-9.03 wt % of the desulfurizer, said non-crystalline iron oxide hydroxide constitutes 90.29 wt %-98.62 wt % of the desulfurizer, and said organic binder constitutes 0.58 wt %-0.89 wt % of the desulfurizer.

Said initial balls are selected from the group consisting of perlite powder, coarse rice, millet, alumina pellets and any combinations thereof.

In said aqueous solution of the organic binder, organic binder constitutes 1 wt.-3 wt % of said aqueous solution.

The diameter of said small balls of non-crystalline iron oxide hydroxide with high sulfur capacity is 4-10 mm.

The present invention also provides a ball-type desulfurizer with high sulfur capacity prepared by the above mentioned process.

The present invention also provides a process for preparing ball-type desulfurizer with high sulfur capacity, comprising the following steps: placing initial balls in a rolling equipment, in which the balls roll; wetting the surface of the initial balls with an aqueous solution of an organic binder; then alternately adding a mixture of non-crystalline iron oxide hydroxide and active carbon powder, and the aqueous solution of the organic binder, so that the mixture of the non-crystalline iron oxide hydroxide and the active carbon powder adheres on the initial balls via the organic binder to gradually form small balls of non-crystalline iron oxide hydroxide with high sulfur capacity and different diameters; and adjusting the shape of the small balls obtained in the above step, and then roasting or naturally drying the small balls to yield the ball-type desulfurizer with high sulfur capacity.

Said initial balls constitutes 0.49 wt %-7.35 wt % of the desulfurizer, said non-crystalline iron oxide hydroxide constitutes 82.76 wt %-93.69 wt % of the desulfurizer, said organic binder constitutes 0.61 wt %-0.89 wt % of the desulfurizer, and said active carbon powder constitutes 4.93 wt %-9.20 wt % of the desulfurizer.

The diameter of said small balls of non-crystalline iron oxide hydroxide with high sulfur capacity is 4-10 mm.

The present invention also provides a ball-type desulfurizer with high sulfur capacity prepared by the above mentioned process.

Compared with the prior art, the advantages offered by the technical solution of the present invention are summarized as follows:

1. In the process of the present invention for preparing ball-type desulfurizer with high sulfur capacity, said aqueous solutions of the organic binder and said non-crystalline iron oxide hydroxide are alternately added into said rolling equipment, allowing to form ball-type desulfurizer by using less binder; in the forming process there is no extrusion, and the obtained desulfurizer products have good diffusion performance, good mechanical property and good water resistance, and the average value of radial anti-crush strength on particles (i.e. radial anti-crush strength) can reach up to 40-110N; the binder content is much reduced and the water resistance (i.e. argillic alteration resistance) is greatly improved, the content of effective active ingredient is increased, and the breakthrough sulfur capacity is increased up to 46% or more. In contrast, in the preparation method in the prior art, a higher content of binder is required to form a desulfurizer and to obtain a strong mechanical strength, thus reducing the content of active ingredient and reducing the desulfurization effect, and besides, when the content of the organic binder is high, the desulfurizer has poor water resistance and is easily expanded and deformed when contacting water; and for extrusion molding of the desulfurizer, the extrusion process will affect the diffusion performance and the mechanical property of the desulfurizer. The process of the present invention solves the above-described problems and has a higher production efficiency, and the production ability is 200-300 kg/h.

2. By selecting millet or coarse rice as the initial balls, it does not need to prepare a ball-type carrier separately, which simplifies the preparation process and saves the production cost, but a desulfurizer with excellent desulfurization effect may still be obtained.

3. In the aqueous solution of the organic binder, the organic binder constitutes 1-3 wt % of the aqueous solution of the organic binder. If the concentration of the organic binder in the aqueous solution exceeds 1-3 wt %, the viscosity of the aqueous solution of the organic binder will be too high, and the aqueous solution of the organic binder cannot be sprayed mechanically. Sesbania powder is preferred to be selected as the binder, high mechanical strength, good diffusion performance and good water resistance as well as high sulfur capacity may be obtained.

4. The diameter of the ball-type desulfurizer is 4-10 mm, which has excellent mechanical strength and chalking resistance; the diameter is preferred to be 6-8 mm, so that the desulfurizer is still crushing resistant and will not be pulverized after soaking treatment in water for a period.

5. For the ball-type desulfurizer with high sulfur capacity of the present invention, said initial balls constitutes 0.98 wt %-9.03 wt % of the desulfurizer, said non-crystalline iron oxide hydroxide constitutes 90.29 wt %-98.62 wt % of the desulfurizer, and said organic binder constitutes 0.58 wt %-0.89 wt % of the desulfurizer. The content of the active ingredient non-crystalline iron oxide hydroxide is high, which makes the desulfurizer products have good desulfurization effect. Here, the organic binder adsorbs the active ingredient via physical interaction. Though the content of the organic binder is low, it does not affect the mechanical strength, so the desulfurizer product has strong mechanical strength. In addition, for the ball-type desulfurizer with high sulfur capacity of the present invention, it facilitates the formation of the desulfurizer in the subsequent stage to add the initial balls at the initial stage of the preparation process.

6. The ball-type desulfurizer with high sulfur capacity of the present invention also comprises active carbon powder, which efficiently improves the diffusion performance of the desulfurizer.

BRIEF DESCRIPTION OF THE DRAWINGS

The present invention will now be described in detail with reference to the Examples and Figure which are given herein below by way of illustration only, and thus are not limitative of the present invention, and wherein, FIG. 1 shows the relation between the pressure drop across beds of the ball-type desulfurizer with high sulfur capacity of the present invention, the linear velocity and the space velocity of gas.

DETAILED EMBODIMENTS OF THIS INVENTION

Example 1

(1) 2 kg alumina pellets are used as initial balls and placed into a granulator for rolling, and sesbania powder is used as binder; the surfaces of the initial balls are wetted by spraying with a small amount of aqueous solution of sesbania powder, wherein the sesbania powder constitutes 1 wt % of the aqueous solution of sesbania powder, and then non-crystalline iron oxide hydroxide is added to start forming balls; subsequently, depending on the size of the formed balls as well as the degree of dry and wet of the surface, the aqueous solution of the sesbania powder and non-crystalline iron oxide hydroxide are added alternately into the granulator, wherein the amount of added non-crystalline iron oxide hydroxide is increased gradually; it is required to spray the aqueous solution of binder when the whole surface of the balls is coated with the non-crystalline iron oxide hydroxide completely, and it is required to add the non-crystalline iron oxide hydroxide when the surface of the balls is wetted by the aqueous solution of the binder. In this step, 200 kg non-crystalline iron oxide hydroxide and 150 kg aqueous solution of sesbania powder are added in total, which spends 1 h, obtaining small balls of iron oxide hydroxide with high sulfur capacity which has a diameter ($\phi$) of 8-10 mm.

(2) The small balls of iron oxide hydroxide with high sulfur capacity obtained in step (1) are put into a rounding machine to adjust the shape for 30 min, and then naturally dried at 45 to yield a ball-type desulfurizer of iron oxide hydroxide named as desulfurizer A.

In the desulfurizer A, said initial balls alumina pellets constitutes 0.98 wt % of the desulfurizer, said non-crystalline iron oxide hydroxide constitutes 98.28 wt % of the desulfurizer, and said organic binder sesbania powder constitutes 0.74 wt % of the desulfurizer.

This example is a preferred example, and the obtained desulfurizer A has a radial anti-crush strength as high as 121.0N and a sulfur capacity up to 46.8%, and has good water resistance and chalking resistance. After soaking in water for 15 days, the desulfurizer A will not broken after pinching by hand and not expand.

Example 2

(1) 1.5 kg perlite powder is used as initial balls and placed into a coating machine for rolling, and carboxymethylcellulose sodium (CMC) is used as organic binder; the surfaces of the initial balls are wetted by spraying a small amount of aqueous solution of CMC, wherein the organic binder CMC constitutes 2 wt % of the aqueous solution of CMC, and then non-crystalline iron oxide hydroxide is added to start forming balls; subsequently, depending on the size of the formed balls as well as the degree of dry and wet of the surface, the aqueous solution of CMC and the non-crystalline iron oxide hydroxide are added alternately into the coating machine, wherein the amount of added non-crystalline iron oxide hydroxide is increased gradually, and it is required to spray the aqueous solution of binder when the whole surface of the balls is coated with the non-crystalline iron oxide hydroxide completely, and it is required to add non-crystalline iron oxide hydroxide when the surface of the balls is wetted by the aqueous solution of the binder. In this step, 150 kg non-crystalline iron oxide hydroxide and 60 kg aqueous solution of CMC are added in total, which spends 1 h, obtaining a small ball of iron oxide hydroxide with high sulfur capacity which has a diameter ($\phi$) of 8-10 mm.

(2) The small balls of iron oxide hydroxide with high sulfur capacity obtained in step (1) are put into a granulator to adjust the shape for 30 min, and then naturally dried at 20° C. to yield a ball-type desulfurizer of iron oxide hydroxide named as desulfurizer B.

In the desulfurizer B, said initial balls perlite powder constitutes 0.98 wt % of the desulfurizer, said non-crystalline iron oxide hydroxide constitutes 98.23 wt % of the desulfurizer, and said organic binder CMC constitutes 0.79 wt % of the desulfurizer.

Example 3

(1) 20 kg coarse rice is used as initial balls and placed into a granulator for rolling, and sesbania powder is used as binder; the surfaces of the initial balls are wetted by spraying a small amount of aqueous solution of sesbania powder, wherein the sesbania powder constitutes 3 wt % of the aqueous solution of sesbania powder, and then non-crystalline iron oxide hydroxide is added to start forming balls; subsequently, depending on the size of the formed balls as well as the degree of dry and wet of the surface, the aqueous solution of sesbania powder and non-crystalline iron oxide hydroxide are added alternately into the granulator, wherein the amount of added non-crystalline iron oxide hydroxide is increased gradually, and it is required to spray the aqueous solution of binder when the whole surface of the balls is coated with the non-crystalline iron oxide hydroxide completely, and it is required to add the non-crystalline iron oxide hydroxide when the surface of the balls is wetted by the aqueous solution of binder. In this step, 200 kg non-crystalline iron oxide hydroxide and 50 kg aqueous solution of sesbania powder are added in total, which spends 1 h, obtaining small balls of iron oxide hydroxide with high sulfur capacity which has a diameter ($\phi$) of 4-6 mm.

(2) The small balls of iron oxide hydroxide with high sulfur capacity obtained in step (1) are put into a granulator to adjust the shape for 30 min, and then roasted at 80° C. for 1 hour to yield a ball-type desulfurizer of iron oxide hydroxide named as desulfurizer C.

In the desulfurizer C, said initial balls coarse rice constitutes 9.03 wt % of the desulfurizer, said non-crystalline iron oxide hydroxide constitutes 90.29 wt % of the desulfurizer, and said organic binder sesbania powder constitutes 0.68 wt % of the desulfurizer.

Example 4

(1) 20 kg millet is used as initial balls and placed into a granulator for rolling, and carboxymethylcellulose sodium (CMC) is used as organic binder; the surfaces of the initial balls are wetted by spraying a small amount of aqueous solution of CMC, wherein the organic binder CMC constitutes 3 wt % of the aqueous solution of CMC, and then non-crystalline iron oxide hydroxide is added to start forming balls; subsequently, depending on the size of the formed balls as well as the degree of dry and wet of the surface, the aqueous solution of CMC and non-crystalline iron oxide hydroxide are added alternately into the granulator, wherein the amount of added non-crystalline iron oxide hydroxide is increased gradually, and it is required to spray the aqueous solution of binder when the whole surface of the balls is coated with the non-crystalline iron oxide hydroxide completely, and it is required to add the non-crystalline iron oxide hydroxide when the surface of the balls is wetted by the aqueous solution of the binder. In this step, 200 kg non-crystalline iron oxide hydroxide and 50 kg aqueous solution of CMC are added in total, which spends 1 h, obtaining small balls of iron oxide hydroxide with high sulfur capacity which has a diameter ($\phi$) of 6-8 mm.

(2) The small balls of iron oxide hydroxide with high sulfur capacity obtained in step (1) are put into a rounding machine to adjust the shape for 30 min, and then roasted at 90° C. for 50 min to yield a ball-type desulfurizer of iron oxide hydroxide named as desulfurizer D.

In the desulfurizer D, said initial balls millet constitutes 2.42 wt % of the desulfurizer, said non-crystalline iron oxide hydroxide constitutes 96.85 wt % of the desulfurizer, and said organic binder CMC constitutes 0.73 wt % of the desulfurizer.

Example 5

(1) 10 kg coarse rice is used as initial balls and placed into a granulator for rolling, and sesbania powder is used as binder; the surfaces of the initial balls are wetted by spraying a small amount of aqueous solution of sesbania powder, wherein sesbania powder constitutes 2.5 wt % of the aqueous solution of sesbania powder, and then non-crystalline iron oxide hydroxide is added to start forming balls; subsequently, depending on the size of the formed balls as well as the degree of dry and wet of the surface, the aqueous solution of the sesbania powder and the non-crystalline iron oxide hydroxide are added alternately into the granulator, wherein the amount of added non-crystalline iron oxide hydroxide is increased gradually, and it is required to spray the aqueous solution of binder when the whole surface of the balls is coated with the non-crystalline iron oxide hydroxide completely, and it is required to add non-crystalline iron oxide hydroxide when the surface of the balls is wetted by the aqueous solution of the binder. In this step, 300 kg non-crystalline iron oxide hydroxide and 72 kg aqueous solution of sesbania powder are added, which spends 1 h, obtaining small balls of iron oxide hydroxide with high sulfur capacity which has a diameter ($\phi$) of 6-8 mm.

(2) The small balls of iron oxide hydroxide with high sulfur capacity obtained in step (1) are put into a granulator to adjust the shape for 20 min, and then naturally dried at −5° C. to yield a ball-type desulfurizer of iron oxide hydroxide named as desulfurizer E.

In the desulfurizer E, said initial balls coarse rice constitutes 3.21 wt % of the desulfurizer, said non-crystalline iron oxide hydroxide constitutes 96.22 wt % of the desulfurizer, and said organic binder sesbania powder constitutes 0.58 wt % of the desulfurizer.

Example 6

(1) 25 kg millet is used as initial balls and placed into a granulator for rolling, and sesbania powder is used as binder;

the surfaces of the initial balls are wetted by spraying a small amount of aqueous solution of sesbania powder, wherein the sesbania powder constitutes 2.5 wt % of the aqueous solution of sesbania powder, and then non-crystalline iron oxide hydroxide is added to start forming balls; subsequently, depending on the size of the formed balls as well as the degree of dry and wet of the surface, the aqueous solution of sesbania powder and the non-crystalline iron oxide hydroxide are added alternately into the granulator, wherein the amount of added non-crystalline iron oxide hydroxide is increased gradually, and it is required to spray the aqueous solution of binder when the whole surface of the balls is coated with the non-crystalline iron oxide hydroxide completely, and it is required to add the non-crystalline iron oxide hydroxide when the surface of the balls is wetted by the aqueous solution of the binder. In this step, 300 kg non-crystalline iron oxide hydroxide and 80 kg aqueous solution of sesbania powder are added in total, which spends 1 h and 20 min, obtaining small balls of iron oxide hydroxide with high sulfur capacity which has a diameter ($\phi$) of 4-6 mm.

(2) The small balls of iron oxide hydroxide with high sulfur capacity obtained in step (1) are put into a rounding machine to adjust the shape for 60 min, and then roasted at 60° C. for 9 h to yield a ball-type desulfurizer of iron oxide hydroxide named as desulfurizer F.

In the desulfurizer F, said initial balls millet constitutes 7.65 wt % of the desulfurizer, said non-crystalline iron oxide hydroxide constitutes 91.74 wt % of the desulfurizer, and said organic binder sesbania powder constitutes 0.61 wt % of the desulfurizer.

Example 7

(1) 7 kg coarse rice is used as initial balls and placed into a granulator for rolling, and sesbania powder is used as binder; the surfaces of the initial balls are wetted by spraying a small amount of aqueous solution of sesbania powder, wherein sesbania powder constitutes 3 wt % of the aqueous solution of sesbania powder, and then non-crystalline iron oxide hydroxide is added to start forming balls; subsequently, depending on the size of the formed balls as well as the degree of dry and wet of the surface, the aqueous solution of sesbania powder and the non-crystalline iron oxide hydroxide are added alternately into the granulator, wherein the amount of added non-crystalline iron oxide hydroxide is increased gradually, and it is required to spray the aqueous solution of binder when the whole surface of the balls is coated with the non-crystalline iron oxide hydroxide completely, and it is required to add the non-crystalline iron oxide hydroxide when the surface of the balls is wetted by the aqueous solution of binder. In this step, 140 kg non-crystalline iron oxide hydroxide and 40 kg aqueous solution of the sesbania powder are added in total, which spends 1 h and 20 min, obtaining small balls of iron oxide hydroxide with high sulfur capacity which has a diameter ($\phi$) of 6-8 mm.

(2) The small balls of iron oxide hydroxide with high sulfur capacity obtained in step (1) are put into a granulator to adjust the shape for 60 min, and then roasted at 90° C. for 8 h to yield a ball-type desulfurizer of iron oxide hydroxide named as desulfurizer G.

In the desulfurizer G, said initial balls coarse rice constitutes 4.72 wt % of the desulfurizer, said non-crystalline iron oxide hydroxide constitutes 94.47 wt % of the desulfurizer, and said organic binder sesbania powder constitutes 0.81 wt % of the desulfurizer.

This example is a preferred example, and the obtained desulfurizer G has a radial anti-crush strength as high as 58N and a sulfur capacity up to 47.7%, and has good water resistance and chalking resistance. After soaking in water for 15 days, the desulfurizer G is still in good shape, and will not broken after pinching with hand and not expand.

Example 8

(1) 1 kg coarse rice is used as initial balls and placed into a granulator for rolling, and sesbania powder is used as binder; the surfaces of the initial balls are wetted by spraying a small amount of aqueous solution of sesbania powder, wherein the sesbania powder constitutes 3 wt % of the aqueous solution of sesbania powder, and then non-crystalline iron oxide hydroxide is added to start forming balls; subsequently, depending on the size of the formed balls as well as the degree of dry and wet of the surface, the aqueous solution of the sesbania powder and the non-crystalline iron oxide hydroxide are added alternately into the granulator, wherein the amount of added non-crystalline iron oxide hydroxide is increased gradually, and it is required to spray the aqueous solution of binder when the whole surface of the balls is coated with the non-crystalline iron oxide hydroxide completely, and it is required to add the non-crystalline iron oxide hydroxide when the surface of the balls is wetted by the aqueous solution of the binder. In this step, 200 kg non-crystalline iron oxide hydroxide and 60 kg aqueous solution of sesbania powder are added in total, which spends 1 h and 20 min, obtaining small balls of iron oxide hydroxide with high sulfur capacity which has a diameter ($\phi$) of 8-10 mm.

(2) The small balls of iron oxide hydroxide with high sulfur capacity obtained in step (1) are put into a granulator to adjust the shape for 60 min, and then roasted at 90° C. for 8 h to yield a ball-type desulfurizer of iron oxide hydroxide named as desulfurizer H.

In the desulfurizer H, said initial balls coarse rice constitutes 4.93 wt % of the desulfurizer, said non-crystalline iron oxide hydroxide constitutes 98.62 wt % of the desulfurizer, and said organic binder sesbania powder constitutes 0.89 wt % of the desulfurizer.

Example 9

(1) 1 kg coarse rice is used as initial balls and placed into a granulator for rolling, and sesbania powder is used as binder; the surfaces of the initial balls are wetted by spraying a small amount of aqueous solution of sesbania powder, wherein the sesbania powder constitutes 3 wt % of the aqueous solution of sesbania powder, and then a mixture of non-crystalline iron oxide hydroxide and active carbon powder are added to starting forming balls; subsequently, depending on the size of the formed balls as well as the degree of dry and wet of the surface, the aqueous solution of the sesbania powder and the mixture of non-crystalline iron oxide hydroxide and active carbon powder are added alternately into the granulator, wherein the amount of added mixture of non-crystalline iron oxide hydroxide and active carbon powder is increased gradually, and it is required to spray the aqueous solution of binder when the whole surface of the balls is coated with the mixture of non-crystalline iron oxide hydroxide and active carbon powder completely, and it is required to add the mixture of non-crystalline iron oxide hydroxide and active carbon powder when the surface of the balls is wetted by the aqueous solution of binder. In this step, the total amount of the non-crystalline iron oxide hydroxide, active carbon powder and the aqueous solution of the sesbania powder added is 190 kg, 10 kg, and 60 kg respectively, and the adding step spends 1 h, obtaining small balls of iron oxide hydroxide with high sulfur capacity which has a diameter (φ) of 6-8 mm.

(2) The small balls of iron oxide hydroxide with high sulfur capacity obtained in step (1) are put into a granulator to adjust the shape for 60 min, and then roasted at 90 for 8 h to yield a ball-type desulfurizer of iron oxide hydroxide named as desulfurizer I.

In the desulfurizer I, said initial balls coarse rice constitutes 0.49 wt % of the desulfurizer, said non-crystalline iron oxide hydroxide constitutes 93.69 wt % of the desulfurizer, said organic binder sesbania powder constitutes 0.89 wt % of the desulfurizer, and said active carbon powder constitutes 4.93 wt % of the desulfurizer.

This example is a preferred example, and the obtained desulfurizer I has a radial anti-crush strength as high as 51.2N and a sulfur capacity up to 46.8%, and has good water resistance and chalking resistance. After soaking in water for 15 days, the desulfurizer I will not broken after pinching with hand and will not expand. The desulfurizer I also has a high permeability.

Example 10

(1) 16 kg coarse rice is used as initial balls and placed into a granulator for rolling, and sesbania powder is used as binder; the surfaces of the initial balls are wetted by spraying a small amount of aqueous solution of sesbania powder, wherein the sesbania powder constitutes 3 wt % of the aqueous solution of sesbania powder, and then a mixture of non-crystalline iron oxide hydroxide and active carbon powder are added to start forming balls; subsequently, depending on the size of the formed balls as well as the degree of dry and wet of the surface, the aqueous solution of sesbania powder and the mixture of non-crystalline iron oxide hydroxide and active carbon powder are added alternately into the granulator, wherein the amount of the added mixture of non-crystalline iron oxide hydroxide and active carbon powder is increased gradually. In this step, the total amount of the non-crystalline iron oxide hydroxide, active carbon powder and the aqueous solution of sesbania powder added is 180 kg, 20 kg, and 50 kg respectively, and the adding step spends 1 h, obtaining small balls of iron oxide hydroxide with high sulfur capacity which has a diameter (φ) of 4-6 mm.

(2) The small balls of iron oxide hydroxide with high sulfur capacity obtained in step (1) are put into a granulator to adjust the shape for 60 min, and then roasted at 90° C. for 8 h to yield a ball-type desulfurizer of iron oxide hydroxide named as desulfurizer J.

In the desulfurizer J, said initial balls coarse rice constitutes 7.35 wt % of the desulfurizer, said non-crystalline iron oxide hydroxide constitutes 82.76 wt % of the desulfurizer, said organic binder sesbania powder constitutes 0.69 wt % of the desulfurizer, and said active carbon powder constitutes 9.20 wt % of the desulfurizer.

Example 11

(1) 1.5 kg coarse rice is used as a initial balls and placed into a granulator for rolling, and carboxymethylcellulose sodium (CMC) is used as organic binder; the surfaces of the initial balls are wetted by spraying a small amount of aqueous solution of CMC, wherein the organic binder CMC constitutes 2.5 wt % of the aqueous solution of CMC, and then a mixture of non-crystalline iron oxide hydroxide and active carbon powder are added to start forming balls; subsequently, depending on the size of the formed balls as well as the degree of dry and wet of the surface, the aqueous solution of CMC and the non-crystalline iron oxide hydroxide are added alternately into the granulator, wherein the amount of added non-crystalline iron oxide hydroxide is increased gradually, and it is required to spray the aqueous solution of binder when the whole surface of the balls is coated with the mixture of non-crystalline iron oxide hydroxide and active carbon powder completely, and it is required to add the mixture of non-crystalline iron oxide hydroxide and active carbon powder when the surface of the balls is wetted by the aqueous solution of binder. In this step, the total amount of added non-crystalline iron oxide hydroxide, active carbon powder and the aqueous solution of CMC is 185 kg, 15 kg, and 50 kg respectively, and the adding step spends 1 h, obtaining small balls of iron oxide hydroxide with high sulfur capacity which has a diameter (φ) of 8-10 mm.

(2) The small balls of iron oxide hydroxide with high sulfur capacity obtained in step (1) are put into a granulator to adjust the shape for 60 min, and then roasted at 90 for 8 h to yield a ball-type desulfurizer of iron oxide hydroxide named as desulfurizer K.

In the desulfurizer K, said initial balls coarse rice constitutes 0.74 wt % of the desulfurizer, said non-crystalline iron oxide hydroxide constitutes 91.25 wt % of the desulfurizer, said organic binder CMC constitutes 0.61 wt % of the desulfurizer, and said active carbon powder constitutes 7.40 wt % of the desulfurizer.

Comparative Example (1) 180 kg non-crystalline iron oxide hydroxide and 20 kg sesbania powder are put into a kneader to knead for 10 min, and then about 40 kg water is added slowly until the degree of dry and wet of the material is suitable for extrudate. Extruding the well mixed material by an extruding machine of φ4 at a pressure of about 0.8 MPa to yield an extrudate desulfurizer.

(2) The extrudate desulfurizer obtained in step (1) is roasted at 90° C. for 8 h, and then the extrudate desulfurizer is broken into small extrudates in length of 5-10 cm to obtain an extrudate desulfurizer of iron oxide hydroxide named as desulfurizer L.

In the desulfurizer L, said non-crystalline iron oxide hydroxide constitutes 90 wt % of the desulfurizer, and said organic binder constitutes 10 wt % of the desulfurizer.

Activity Evaluation (1) Evaluation of sulfur capacity and test of radial anti-crush strength: using the extrudate desulfurizer L prepared by the extruding process of prior art as the comparative example, taking 1 g of each of the desulfurizers A-K obtained in the above examples 1-11 respectively and 1 g desulfurizer L obtained in the comparative example, the sulfur capacity of these desulfurizers is measured at normal temperatures (environmental temperature, normally −5 −45) and normal pressures (environmental pressure, normally one atmospheric pressure) by using a standard gas containing 4% $H_2S$.

Wherein, an aqueous solution of silver nitrate containing 1 wt % silver nitrate can be prepared and used for the qualitative measurement of the sulfur at the outlet; the quantitative measurement is conducted using a WK-2C integrated microcoulometer (made in China), which has a minimal measurement volume of 0.2 ppm. The measurement of the mechanical strength of the desulfurizers obtained in the above examples is conducted by evaluating their strength, wherein the average value of radial anti-crush resistance on particles is measured according to the standard HG/T2782. The results are shown in the table below.

|  | Example No. | | | | | | | | | | | Comparative Example |
|---|---|---|---|---|---|---|---|---|---|---|---|---|
|  | 1 | 2 | 3 | 4 | 5 | 6 | 7 | 8 | 9 | 10 | 11 | |
| Desulfurizer No. | A | B | C | D | E | F | G | H | I | J | K | L |
| Diameter (Φ/mm) | 8-10 | 8-10 | 4-6 | 6-8 | 6-8 | 4-6 | 6-8 | 8-10 | 6-8 | 4-6 | 8-10 | Φ4 * 5-10 |
| Sulfur Capacity/% | 46.8 | 45.8 | 46.2 | 45.9 | 44.3 | 44.8 | 47.7 | 45.2 | 46.8 | 45.7 | 46.2 | 42.1 |
| Radial Anti-crush Strength/N | 121.0 | 81.5 | 11.3 | 44.6 | 38.2 | 25.3 | 58 | 118.7 | 51.2 | 80 | 79 | 40 |
| Bulk Density/ kg·L⁻¹ | 1.06 | 1.06 | 0.91 | 1.01 | 1.01 | 0.91 | 1.01 | 1.06 | 0.93 | 0.89 | 0.91 | 0.71 |
| Binder Content/% | 0.77 | 0.79 | 0.68 | 0.73 | 0.58 | 0.61 | 0.81 | 0.89 | 0.89 | 0.69 | 0.61 | 10 |

(2) Evaluation test of diffusion performance: The ball-type desulfurizers obtained in examples 4 and 9 (the same size) and the extrudate product obtained by extruding in the comparative example are used for carrying out the evaluation test of diffusion performance. The evaluation test lasts for 1 h and 20 min, and is stopped when the ball-type desulfurizer of example 9 is completely turned to black color. Analyzing according to the phenomenon, the following conclusions are obtained:

The permeability of the ball-type desulfurizer of example 9 in which active carbon power is added is better than the permeability of the ball-type desulfurizer of example 4, and the oxidation rate of desulfurizer of example 9 is also faster. The permeability of both of the desulfurizers of examples 4 and 9 is better than the extrudate product obtained by extruding. Using the phenomenon that the ball-type desulfurizer of example 9 containing active carbon power is completely turned to black color as a reference (exclusive of initial balls part), it can be inferred that: the permeability of the ball-type desulfurizer of example 9 containing active carbon power is 100%, and the permeability of the ball-type desulfurizer of example 4 is 90%, and the permeability of the extrudate product obtained by extruding is 76.5%.

(3) Evaluation test of water resistance performance: the ball-type desulfurizers with different diameters obtained in examples 1-8 are immersed in water for 15 days, then the following phenomenon are found: the ball-type desulfurizer with a diameter of 4-6 mm is broken, and the initial balls are exposed; the ball-type desulfurizer with a diameter of 6-8 mm maintains good shape without expansion, and is not broken after pinching with hand, and still maintains good strength; the ball-type desulfurizer with a diameter of 8-10 mm presents falling off of layer(s), but is not broken after pinching with hand and is not expanded; and the extrudate product obtained by extruding completely expands and is pulverized.

(4) Example for the evaluation of pressure drop of particles: The reactor has a diameter of 300 mm and a height of 6500 mm, and the bulk density of the desulfurizer is 0.8-1.05 kg/L. In this experiment, compressed air is used and the compressed air enters from below and exits at the top. The detailed data is shown in the table below, wherein the space velocity GHSV refers to the amount of the compressed air passing through unit volume of the desulfurizer in unit time.

Test for Pressure Drop of Industrial Primary Particle

| Diameter mm | Loading Height h | Flow Rate m³/h | Space Velocity GHSV | Linear Velocity m/s | Pressure drop across beds | |
|---|---|---|---|---|---|---|
| | | | | | In total atm | Per meter mm/H₂O |
| Example 3 Φ4-6 | 5.5 | 77 | 198 | 0.30 | 0.05 | 91 |
| | 5.5 | 140 | 360 | 0.55 | 0.15 | 273 |
| | 5.5 | 220.5 | 566 | 0.87 | 0.325 | 591 |
| | 5.5 | 280 | 720 | 1.10 | 0.475 | 864 |
| | 5.5 | 305 | 900 | 1.38 | 0.475 | 864 |
| | 5.5 | 406 | 1044 | 1.60 | 0.55 | 1000 |
| Example 4 Φ6-8 | 4.25 | 73.5 | 245 | 0.29 | 0.075 | 176 |
| | 4.25 | 150.5 | 501 | 0.59 | 0.1 | 235 |
| | 4.25 | 213.5 | 712 | 0.84 | 0.15 | 353 |
| | 4.25 | 276.5 | 922 | 1.09 | 0.275 | 647 |
| | 4.25 | 346.5 | 1155 | 1.36 | 0.2 | 470 |
| | 4.25 | 399 | 1330 | 1.57 | 0.3 | 705 |
| Example 1 Φ8-10 | 4.95 | 94.7 | 270 | 0.37 | 0.05 | 100 |
| | 4.95 | 168 | 480 | 0.66 | 0.05 | 100 |
| | 4.95 | 220.5 | 630 | 0.87 | 0.075 | 150 |
| | 4.95 | 280 | 800 | 1.10 | 0.075 | 150 |
| | 4.95 | 350 | 1000 | 1.37 | 0.075 | 150 |
| | 4.95 | 378 | 1080 | 1.48 | 0.075 | 150 |
| Comparative Example Extrudate Product Φ4 * 5-10 | 5.9 | 80.5 | 230 | 0.32 | 0.075 | 127 |
| | 5.9 | 140 | 336 | 0.55 | 0.1 | 169 |
| | 5.9 | 210 | 504 | 0.74 | 0.125 | 212 |
| | 5.9 | 301 | 722 | 1.18 | 0.175 | 297 |
| | 5.9 | 371 | 890 | 1.46 | 0.175 | 297 |
| | 5.9 | 406 | 974 | 1.60 | 0.175 | 297 |

As shown in FIG. 1, in the same linear velocity, the ball-type desulfurizer with a diameter φ6-8 mm shows the minimum pressure drop across beds, which is lower than the pressure drop for the extrudate product. The value of the pressure drop across beds is in the following order: φ4-6 mm>φ6-8 mm>φ4*5-10 mm>φ8-10 mm.

From the above examples combined with the results of the activity evaluation and the test for pressure drop of primary particle, it can be seen clearly that, the ball-type desulfurizer of iron oxide hydroxide with high sulfur capacity of the present invention has a sulfur capacity as high as 47.7% when used at normal temperature and pressure, and has a radial anti-crush strength reaching up to 121N, and has good permeability and water resistance.

Above particular embodiments of the invention have been shown and described for description rather than limitation. It will be obvious to those skilled in the art that changes and modifications may be made without departing from the invention in its broader aspects, and, therefore, all such changes and modifications fall within the true spirit and scope of the invention.

The invention claimed is:

1. A process for preparing a ball-type desulfurizer with a high sulfur capacity, the process comprising the following steps:
   (1) placing initial balls made of a substance not including non-crystalline iron oxide hydroxide and an organic binder into a rolling machine; (2) wetting a surface of the initial balls with an aqueous solution of the organic binder;
   (3) then alternately adding the non-crystalline iron oxide hydroxide and the aqueous solution of the organic binder to the initial balls, so that the non-crystalline iron oxide hydroxide adheres to the initial balls via the organic binder to form balls with different diameters; and
   (4) adjusting a shape of the balls obtained in the step (3); and
   (5) then roasting or drying the balls in the step (4) to yield the ball-type desulfurizer with the high sulfur capacity;
   wherein, the initial balls constitute 0.98 wt %-9.03 wt % of the desulfurizer,
   the non-crystalline iron oxide hydroxide constitutes 90.29 wt %-98.28 wt % of the desulfurizer, and
   the organic binder constitutes 0.74 wt %-0.89 wt % of the desulfurizer.

2. The process of claim 1, wherein, said the initial balls are selected from the group consisting of alumina pellets, perlite powder, coarse rice, millet and any combination thereof.

3. The process of claim 1, wherein, in the aqueous solution of the organic binder, the organic binder constitutes 1-3 wt % of said the aqueous solution of the organic binder.

4. The process of claim 2, wherein, in the aqueous solution of the organic binder, the organic binder constitutes 1-3 wt % of-said the aqueous solution of the organic binder.

5. The process of claim 1, wherein, the diameter of each of the balls obtained in the step (3) is 4-10 mm.

6. The process of claim 2, wherein, the diameter of each of the balls obtained in the step (3) of non crystalline iron oxide hydroxide with high sulfur capacity is 4-10 mm.

7. A process for preparing a ball-type desulfurizer with high sulfur capacity, comprising the following steps:
   (1) placing initial balls of a substance not including a mixture of the non-crystalline iron oxide hydroxide and an active carbon powder into a rolling machine; in a rolling equipment;
   (2) wetting the surface a surface of the initial balls with an aqueous solution of an organic binder;
   (3) then alternately adding a mixture of the non-crystalline iron oxide hydroxide and the active carbon powder, and the aqueous solution of the organic binder to the initial balls, so that the mixture of the non-crystalline iron oxide hydroxide and the active carbon powder adheres on the initial balls via the organic binder to from the balls with different diameters;
   (4) adjusting a shape of the balls obtained in the step (3); and
   (5) then roasting or naturally drying the small balls obtained in the step (4) to yield the ball-type desulfurizer with the high sulfur capacity;
   wherein, the initial balls constitutes 0.49 wt %-7.35 wt % of the desulfurizer,
   the non-crystalline iron oxide hydroxide constitutes 82.76 wt %-93.69 wt % of the desulfurizer,
   the organic binder constitutes 0.61 wt %-0.89 wt % of the desulfurizer, and
   active carbon powder constitutes 4.93 wt %-9.20 wt % of the desulfurizer.

8. The process of claim 7, wherein, the diameter of the balls obtained in the step (3) is 4-10 mm.

* * * * *